(12) United States Patent
Yue et al.

(10) Patent No.: US 11,112,850 B2
(45) Date of Patent: Sep. 7, 2021

(54) IN-VEHICLE TERMINAL WITH ENHANCED COMPATIBILITY AND METHOD FOR TURNING ON/OFF IT

(71) Applicant: MediaTek Singapore Pte. Ltd., Singapore (SG)

(72) Inventors: Zhuxiong Yue, Shenzhen (CN); Yun Ning, Shenzhen (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 143 days.

(21) Appl. No.: 16/525,568

(22) Filed: Jul. 29, 2019

(65) Prior Publication Data

US 2020/0150742 A1 May 14, 2020

(30) Foreign Application Priority Data

Nov. 9, 2018 (CN) .......................... 201811331266.9

(51) Int. Cl.
*G06F 1/00* (2006.01)
*G06F 1/3246* (2019.01)
*B60R 16/03* (2006.01)
*G06F 1/3203* (2019.01)

(52) U.S. Cl.
CPC ............ *G06F 1/3246* (2013.01); *B60R 16/03* (2013.01); *G06F 1/3203* (2013.01); *G06F 2213/0042* (2013.01)

(58) Field of Classification Search
CPC ........... G06F 1/3246; G06F 2213/0042; B60R 16/03

USPC ......................................................... 713/300
See application file for complete search history.

(56) References Cited

U.S. PATENT DOCUMENTS

| 8,237,414 B1* | 8/2012 | Li | G06F 1/266 |
| | | | 320/160 |
| 2014/0207977 A1* | 7/2014 | Hang | G06F 13/385 |
| | | | 710/16 |
| 2015/0143138 A1* | 5/2015 | Chang | G06F 13/385 |
| | | | 713/300 |

(Continued)

FOREIGN PATENT DOCUMENTS

| CN | 105874682 A | 8/2016 |
| CN | 107632949 A | 1/2018 |

(Continued)

*Primary Examiner* — Volvick Derose
(74) *Attorney, Agent, or Firm* — Winston Hsu

(57) ABSTRACT

The present invention provides an in-vehicle terminal and a method for turning on/off the in-vehicle terminal. The in-vehicle terminal includes a switch circuit. The switch circuit includes: an output circuit, a control circuit, a first input circuit, a second input circuit and a control circuit. The first input circuit is configured to transmit the received first trigger signal to the output circuit. The second input circuit is configured to transmit the received second trigger signal to the output circuit. The output circuit is configured to output a first control signal for turning on/off the vehicle terminal according to the first trigger signal or the second trigger signal. The control circuit is configured to block the second trigger signal from being transmitted to the output circuit when both the first input circuit and the second input circuit are transmitting a corresponding trigger signal to the output circuit.

17 Claims, 9 Drawing Sheets

(56) References Cited

U.S. PATENT DOCUMENTS

| | | | | |
|---|---|---|---|---|
| 2015/0194834 A1* | 7/2015 | Lee | ................... | H02J 7/0072 |
| | | | | 320/107 |
| 2016/0188520 A1* | 6/2016 | Lei | ................... | G06F 13/4282 |
| | | | | 710/105 |
| 2017/0336844 A1* | 11/2017 | Koga | ................... | G06F 1/266 |
| 2018/0018934 A1* | 1/2018 | Lim | ................ | H01R 13/6683 |
| 2019/0013664 A1* | 1/2019 | Yasunori | ................ | B60R 16/03 |

FOREIGN PATENT DOCUMENTS

| | | |
|---|---|---|
| CN | 107957966 A | 4/2018 |
| TW | 201814543 A | 4/2018 |

\* cited by examiner

IN-VEHICLE TERMINAL WITH ENHANCED COMPATIBILITY AND METHOD FOR TURNING ON/OFF IT

BACKGROUND

1. Field of the Invention

The present invention relates to an in-vehicle technology, and more particularly, to an in-vehicle terminal and a method for turning on/off it.

2. Description of the Prior Art

With the developments in industries and improvement of living standards, the ownership of a household automobile has become more and more prevalent. In addition, to improve the comfort and safety of driving, automobiles nowadays are designed to having more and more functions. For example, air conditioning, audio system, navigation system, driving recorder, etc. can be mounted in the automobile as in-vehicle terminals to improve the user experience. All of the aforementioned in-vehicle terminals rely on the vehicle to provide power, and there are a plenty of ways for a vehicle to provide power. In most of the related art techniques, each in-vehicle terminal has its own manner of power supply, and may be different from that of one another. This causes great inconveniences for users.

SUMMARY

An objective of the present invention is to provide an in-vehicle terminal and a method for turning on/off it.

An embodiment of the present invention provides an in-vehicle terminal. The in-vehicle terminal comprises a switch circuit, wherein the switch circuit comprises an output circuit, a control circuit, a first input circuit and a second input circuit. The first input circuit is configured to transmit a received first trigger signal to the output circuit. The second input circuit is configured to transmit a received second trigger signal to the output circuit. The output circuit is configured to output a first control signal for turning on/off the in-vehicle terminal according to the first trigger signal or the second trigger signal; and the control circuit is further configured to block the received second trigger signal from being transmitted to the output circuit when both the first input circuit and the second input circuit are transmitting the corresponding received trigger signal to the output circuit.

An embodiment of the present invention provides a method for turning on/off an in-vehicle terminal comprising a switch circuit. The in-vehicle terminal comprises a switch circuit, wherein the switch circuit comprises an output circuit, a control circuit, a first input circuit and a second input circuit. The method comprises the steps of: the first input circuit receiving and transmitting a first trigger signal to the output circuit, and/or the second input circuit receiving and transmitting a second trigger signal to the output circuit; the output circuit outputting a first control signal for indicating to turn on/off the in-vehicle terminal according to the first trigger signal or the second trigger signal to; and the control circuit blocking the second trigger signal from being transmitted to the output circuit when both the first input circuit and the second input circuit are transmitting the corresponding trigger signal to the output circuit.

With embodiments of the present invention, the compatibility issue of multiple in-vehicle terminals each having different power supply manners can be solved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
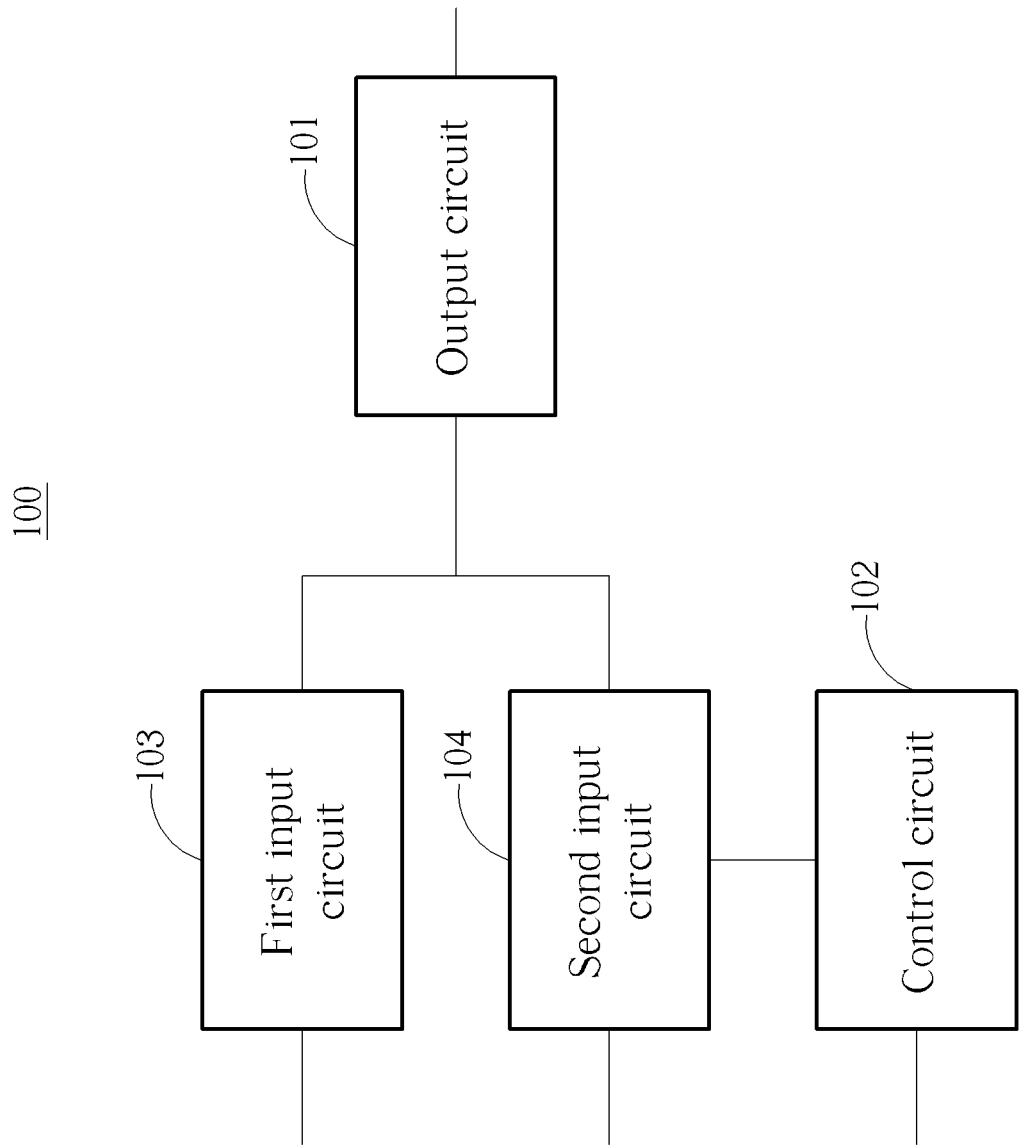
FIG. 1 is a diagram illustrating the framework of an in-vehicle terminal according to an embodiment of the present invention.

In general, in-vehicle terminals comprise air conditioning, audio system, navigation system, driving recorder, etc. In-vehicle terminals obtain the power required for operations through the connection with the car (or vehicle). In-vehicle terminals may be connected to the car in various ways, and therefore there are many different manners of power supply. Three major manners of power supply are introduced as follows.

The first type may be called "Buck line type". In the Buck line type, an in-vehicle terminal may be powered via the roof light or the insurance box of the vehicle. In general, the voltage of the roof light or that of the insurance box is 12V, which can be pulled down to 5V via the buck line, and may be provided to the Universal Serial Bus (USB) port for powering the in-vehicle terminal. The roof light or the insurance box comprises the following three pins: B+, Ground and ACC (Accessory, which is the power source used by the car). When the in-vehicle terminal is powered by the roof light or the insurance box, the roof light or the insurance box is coupled to the car battery, the voltage at the B+ pin is constant, and the state of the USB Identity (ID) signal derived by the ACC pin is simultaneous with the turning on/off of the car. Hence, the turning on/off of the in-vehicle terminal may be achieved through identifying the USB ID signal. For example, when the car is powered on, the in-vehicle terminal will be enabled; and when the car is powered off, the in-vehicle terminal is disabled.

The second type may be called "Car-universal type". In this manner, an in-vehicle terminal may be powered via the USB port of the car charger. The USB port may comprise: a power line and a ground line. The turning on/off of the in-vehicle terminal may be determined by the VBUS signal of the USB port. For example, when the car is powered on, the USB port may provide power to enable the in-vehicle terminal; and when the car is powered off, the USB port is disconnected from power, and thus the in-vehicle terminal will be disabled.

The third type may be called "Car-dedicated type". In this manner, an in-vehicle terminal may be powered by the car battery, wherein the car battery may comprise: a B+ signal line, a Ground line and an ACC signal line. The car battery is used as an external power to couple to the in-vehicle terminal. More specifically, the in-vehicle terminal may be electrically connected to the ACC signal line. The ACC signal transmitted by the ACC signal line may be controlled by the car key. The in-vehicle terminal can be turned on or off according to the ACC signal. For example, when the car is powered on, the in-vehicle terminal will be enabled; and when the car is powered off, the in-vehicle terminal will be disabled.

In tradition methods, the in-vehicle terminal is usually configured with only one manner of the power supply, and this greatly limits the application of the in-vehicle terminal.

Further, regarding the above-mentioned Car-dedicated type and the Buck line type, when being provided with power, the power state thereof is always "online". As to the Buck line type and the Car-universal type, since both of the Buck line type and the Car-universal type obtain power from the USB port, while the Buck line type is selected, (i.e. the USB ID signal is obtained from the USB port), the USB port also provides the VBUS signal at the same time, thereby making the VBUS signal and the USB ID signal input signals simultaneously. In addition, since the VBUS signal is always in the online state, the system cannot be turned on/off according to the USB ID signal.

An embodiment of the present invention provides an in-vehicle terminal and a turning on/off method thereof to solve the above issue. The detailed descriptions are as follows.

Please refer to FIG. 1, which is a diagram illustrating the framework of an in-vehicle terminal according to an embodiment of the present invention. As shown in FIG. 1, an in-vehicle terminal 100 comprises an output circuit 101, a control circuit 102, a first input circuit 103 and a second input circuit 104. The first input circuit 103 is configured to transmit the received first trigger signal to the output circuit 101. The second input circuit 104 is configured to transmit the received second trigger signal to the output circuit 101. The first input circuit 103 and the second input circuit 104 have different connection manners corresponding to the in-vehicle terminal 100. The first trigger signal and second trigger signal are generated according to the different connection manners. For example, if the connection manner of the first input circuit 103 is corresponding to the Buck line type mentioned in the previous paragraphs, the connection manner of the second input circuit 104 may be corresponding to the aforementioned Car-universal type. In this way, the first trigger signal may comprise a USB ID signal, the second trigger signal may comprise a VBUS signal.

The output circuit 101 is configured to refer to first trigger signal or second trigger signal to output the first control signal for indicating to turn on/off the in-vehicle terminal 100. The output circuit 101 may refer to different connection manners to generate the trigger signal to output the first control signal for indicating to turn on or off the in-vehicle terminal.

For example, if the connection manner corresponding to the Buck line type is selected, the first input circuit 103 may receive the USB ID signal, and the output circuit 101 may output first control signal according to the USB ID signal.

In another example, if the connection manner corresponding to the Car-universal type is selected, the second input circuit 104 receives the VBUS signal, and the output circuit 101 outputs the first control signal according to the VBUS signal. The control circuit 102 is configured to block the second trigger signal from transmitting to the output circuit while both the first input circuit 103 and the second input circuit 104 are transmitting trigger signals to the output circuit 101.

As mentioned above about the aforementioned example, the connection manner of the first input circuit 103 is obtaining power from the buck line through the roof light, and the connection manner of the second input circuit 104 is obtaining power from the USB port of the car charger.

When the connection manner of the first input circuit 103 is adopted, the USB port remains in the online state, and the VBUS signal also may be input to the switch circuit. When adopting the connection manner corresponding to the first input circuit 103, the control circuit 102 blocks the VBUS signal from transmitting to the output circuit 101. This makes the output circuit 101 can only receive and detect the USB ID signal, and is thereby compatible to said two power supply manners.

Figure 2:
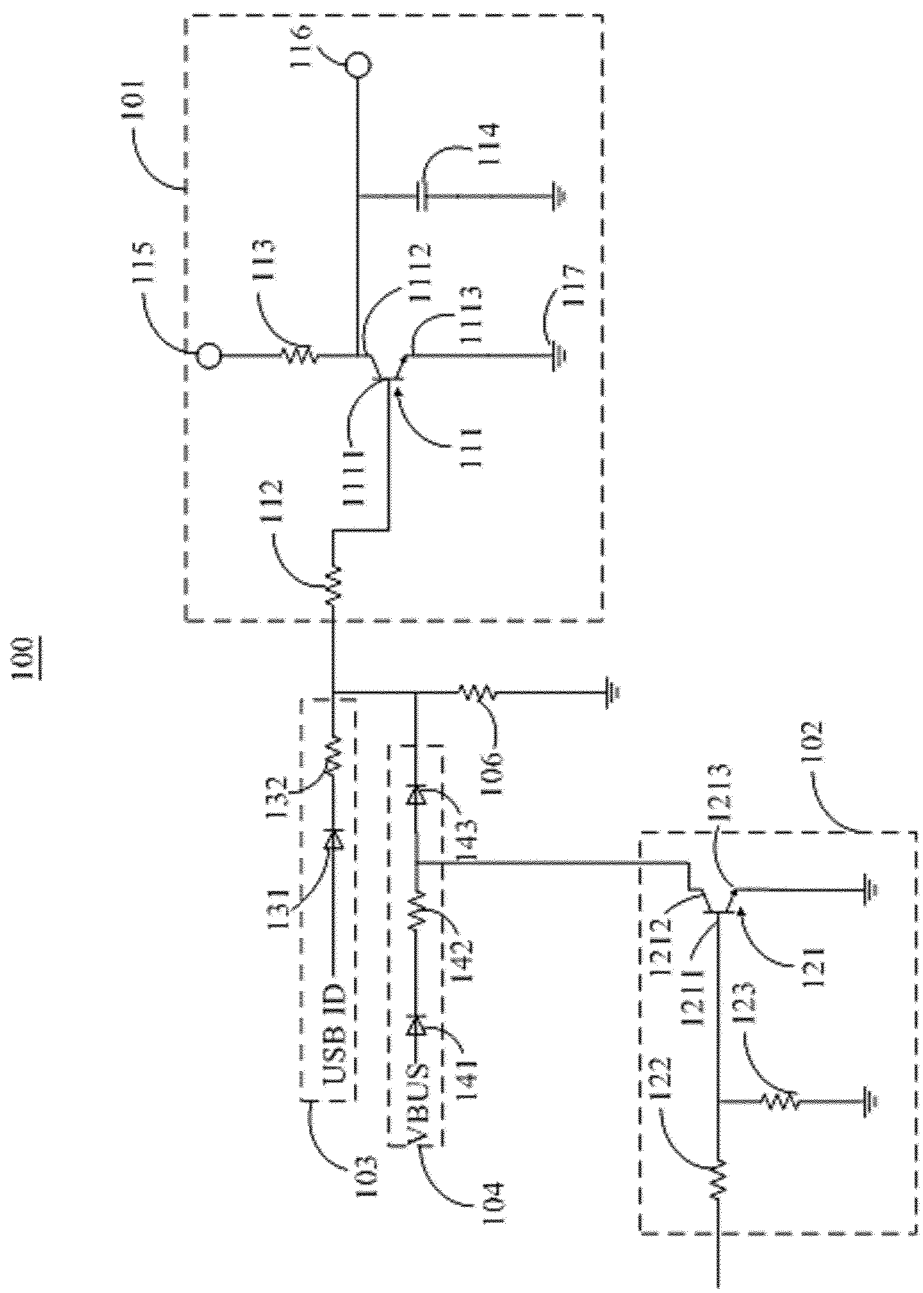
FIG. 2 is a diagram illustrating the circuit of the in-vehicle terminal shown in FIG. 1.

FIG. 2 is a diagram illustrating the circuit of the in-vehicle terminal shown in FIG. 1. One thing should be noted is that the first trigger signal in this embodiment comprises the USB ID signal, and the second trigger signal comprises the VBUS signal.

As shown in FIG. 2, the first input circuit 103 comprises a unidirectional conduction element 131 and a resistor 132 serially coupled to each other. The input terminal of the unidirectional conduction element 131 is arranged to receive the USB ID signal. The output terminal of the unidirectional conduction element 131 is coupled to the input of the output circuit 101 via the resistor 132, and is configured to transmit the USB ID signal to the output circuit 101 via the resistor 132. In the unidirectional conduction element 131, signals flow in a single direction from the input terminal to the output terminal, i.e. from left to right. The voltage from the input terminal to the output terminal of the unidirectional conduction element 131 may be defined as a forward voltage. On the contrary, the voltage from the output terminal to the input terminal of the unidirectional conduction element 131 may be defined as a reverse voltage. Due to the forward voltage, the resistance of the unidirectional conduction element 131 can be very little, and thus the unidirectional conduction element 131 will be in a conducting state (equivalent to a turned on switch). In another example, due to the reverse voltage, the resistance can be very large, making the unidirectional conduction element 131 be in a cut-off state (equivalent to a turned off switch). This design may prevent signals from flowing reversely. The conduction element 131 may comprise a diode, as shown in FIG. 1. The input terminal of the diode is the anode, and the output terminal of the diode is the cathode. In some embodiments, the resistor 132 can be omitted, that is, the output terminal of the unidirectional conduction element 131 may be directly coupled to the output circuit 101.

As shown in FIG. 2, the second input circuit 104 comprises the unidirectional conduction element 141, the resistor 142 and the unidirectional conduction element 143, which are coupled in series with a sequence. The input terminal of the unidirectional conduction element 141 is arranged to receive the VBUS signal, the output terminal of the unidirectional conduction element 141 is coupled to the input terminal of the unidirectional conduction element 143 via the resistor 142, and the output terminal of the unidirectional conduction element 143 is coupled to the input of the output circuit 101. And thus, the VBUS signal received by the unidirectional conduction element 141 is transmitted to the input terminal of the unidirectional conduction element 143 via the resistor 142, and the output terminal of the unidirectional conduction element 143 further transmits the VBUS signal to the output circuit 101. The unidirectional conduction elements 141 and 143 may be implemented with diodes, and the resistance of the resistor 142 may be flexibly selected based on actual situations. In an embodiment, the resistor 142 may be omitted, that is, the output terminal of the unidirectional conduction element 141 may be directly connected to the input terminal of the unidirectional conduction element 142.

As shown in FIG. 2, the control circuit 102 may comprise: a switch unit 121, and resistors 122 and 123. The switch unit 121 comprises a control terminal 1211, a first terminal 1212 and a second terminal 1213, wherein the control terminal 1211 of the switch unit 121 is electrically connected to the resistor 122. The first terminal 1212 of the switch unit 121 is electrically connected to the connection node between the resistor 142 and the unidirectional conduction element 143. The second terminal 1213 of the switch unit 121 is coupled to a ground, and utilizes the ground as the blocking voltage signal source. However, the present invention is not limited to the above manner, and other voltages can be also adopted as the blocking voltage. When the first the control terminal 1211 receives the control signal, the first terminal 1212 is coupled to the second terminal 1213, and then the voltage level of the connection node between the resistor 142 and the unidirectional conduction element 143 can be clamped at the blocking voltage. The conditions of selecting the blocking voltage at least include making the voltage level of the input terminal of the second the unidirectional conduction element 143 beyond the identifying range of the output circuit 101, which means the selected blocking voltage will not trigger the output of the output circuit 101. One terminal of the resistor 123 is electrically connected to the resistor 122 and the control terminal 1211 of the switch unit 121, and the other terminal is coupled to the ground. In some embodiments, the switch unit 121 may be an NPN transistor which is turned on by a high voltage level. The control terminal 1211 is the base of the NPN transistor, the first terminal 1212 is the collector of the NPN transistor, and the second terminal 1213 is the emitter of the NPN transistor. It should be noted that in some embodiments, the switch unit 121 may be other types of switch, such as a PNP transistor that is turned on by a low voltage level. The control terminal 1211 is the base of the PNP transistor, the first terminal 1212 is the collector of the PNP transistor, and the second terminal 1213 is the emitter of the PNP transistor. The voltage level of the second control signal received by the second terminal 1213 of the PNP transistor is the opposite of the voltage level of the second control signal received by the NPN transistor.

In the following example, the ground voltage level is used as the blocking voltage, and in the introduction of the control theory of the control circuit 102, the switch unit 121 is an NPN transistor.

When both the first input circuit 103 and the second input circuit 104 transmit a trigger signal to the output circuit 101, the control terminal 1211 of the switch unit 121 receives the second control signal with a high voltage level via the resistor 122. The first terminal 1212 is coupled to the second terminal 1213, and then, the voltage level of the connection node between the resistor 142 and the unidirectional conduction element 143 will be clamped at a low voltage level. In this way, the VBUS signal can be clamped at the low voltage level, in order to preventing the VBUS signal from being transmitted to the output circuit 101, wherein the second control signal is generated when the second input circuit 104 receives the USB ID signal.

Please further refer to FIG. 2, the output circuit 101 comprises a switch unit 111, resistors 112 and 113, and a capacitor 114, wherein the switch unit 111 comprises a control terminal 1111, a third terminal 1112 and a fourth terminal 1113. The control terminal 1111 is coupled to the outputs of the first input circuit 103 and the second input circuit 104 via the resistor 112, and is configured to receive the VBUS signal or the USB ID signal via the resistor 112. The third terminal 1112 of the switch unit 111 is coupled to the first voltage signal source 115 via the resistor 113, and the third terminal 1112 is further coupled to a touch port 116. The fourth terminal 1113 of the switch unit 111 is coupled to the second voltage signal source 117. The capacitor 114 is coupled between the third terminal 1112 of the switch unit 111 and ground, and is configured to filter the control signal output from the output circuit 101.

As shown in FIG. 2, the switch unit 111 may be an NPN transistor which is turned on by a high voltage level. The control terminal 1111 is the base of the NPN transistor, the third terminal 1112 is the collector of the NPN transistor, and the fourth terminal 1113 is the emitter of the NPN transistor. The first voltage signal source 115 may be a power source, and the second voltage signal source 117 may be the ground. It should be noted that in some embodiments, the switch unit 111 may be a PNP transistor that is turned on by a low voltage level. The control terminal 1111 is the base of the PNP transistor, the third terminal 1112 is the collector of the PNP transistor, and the fourth terminal 1113 is the emitter of the PNP transistor. The first voltage signal source 115 may be the ground, and the second voltage signal source 117 may be a power source.

As can be seen from the above description, the output circuit 101 may output a control signal to the touch port 116 via the switch unit 111 according to the VBUS signal and the USB ID signal, wherein the touch port 116 may be a General Purpose Input Output (GPIO) port. Other circuit elements of the in-vehicle terminal 100 may turn on/off the in-vehicle terminal 100 according to the signal state of the GPIO port. For example, if the switch unit 111 is an NPN transistor, the in-vehicle terminal 100 may be turned on when the voltage level of the GPIO port drops to a low voltage level from a high voltage level, and the in-vehicle terminal 100 may be turned off when the voltage level of the GPIO port rises to the high voltage level from the low voltage level.

The following example is based on the circuit structure of the aforementioned switch circuit, and uses the switch units 111 and 121 as NPN transistors to describe the operation details of the switch circuit:

If the user connects the in-vehicle terminal to the vehicle by selecting the connection manner corresponding to the second input circuit 104, after the vehicle is powered on, the VBUS signal of the USB port changes from 0V to 5V. In addition, the VBUS signal is transmitted to the output circuit 101 through the resistor 142 and two diodes 141 and 143, and is further transmitted to the base 1111 of the NPN transistor 111 via the resistor 112. The VBUS signal of the high voltage level may turn on the NPN transistor 111, and more specifically, may conduct the collector 1112 of the NPN transistor 111 to the emitter 1113 of the NPN transistor 111 in order to pull down the voltage level at the collector 1112 to a low voltage level. That is, the control signal in the low voltage level is outputted to the GPIO port 116 to indicate that the in-vehicle terminal 100 is turned on. After the vehicle is powered off, the VBUS signal of the USB port changes from 5V to 0V. The VBUS signal in the low voltage level may turned off the NPN transistor 111, and more specifically, may disconnect the collector 1112 of the NPN transistor 111 from the emitter 1113 of the NPN transistor 111 in order to make the voltage level at the collector 1112 be pulled up by the power source. That is, a control signal in the high voltage level is outputted to the GPIO port 116 to indicate that the in-vehicle terminal 100 is turned off.

If the user connects the in-vehicle terminal to the vehicle by selecting the connection manner corresponding to the first input circuit 103, after the first boot-up, the voltage level at the base 1211 of the NPN transistor 121 is pulled up by the control signal, and then, the collector 1212 is pulled down by the emitter 1213 to the low voltage level, and the voltage level of the connection node between the resistor 142 and the diode 143 is clamped at the low voltage level. That is, the VBUS signal will be clamped at the low voltage level. In this way, after the vehicle is power on, the USB ID signal will be changed from the low voltage level to the high voltage level. In addition, the USB ID signal is transmitted to the output circuit 101 through the diode 131 and the resistor 132, and is further transmitted to the base 1111 of the NPN transistor 111 via the resistor 112. The USB ID signal in the high voltage level may turn on the NPN transistor 111, and conduct the collector 1112 of the NPN transistor 111 to the emitter 1113 of the NPN transistor 111 and thereby pulls down the voltage level at the collector 1112 to the low voltage level. That is, the control signal in the low voltage level is outputted to the GPIO port to indicate that the in-vehicle terminal 100 is turned on. After the vehicle is powered off, the USB ID signal of the USB ID signal line is changed from the high voltage level to the low voltage level. The USB ID signal in the low voltage level may turn off the NPN transistor 111, and disconnect the collector 1112 of the NPN transistor 111 from the emitter 1113 of the NPN transistor 111, and thereby the voltage level at the collector 1112 is pulled up by the power source 115. That is, the control signal of the high voltage level is outputted to the GPIO port 116 to indicate that the in-vehicle terminal 100 is turned off. Since the voltage level at the connection node of the resistor 142 and the diode 143 is clamped at the low voltage level, the state change of the VBUS signal will not affect the power on/off signals of the vehicle.

In aforementioned embodiments, since the USB ID signal and the VBUS signal may be directly affected by the power on/off of the vehicle, no matter which kind of connection manner is selected by the user, the in-vehicle terminal 100 may be activated/disabled through turning on/off the vehicle.

The switch circuit disclosed above is merely compatible with the two connection manners respectively corresponding to the Car-universal type and the Buck line type. In other embodiments, the switch circuit may further be compatible with the connection manner corresponding to the aforementioned Car-dedicated type, and more detailed illustrations can be referred to FIG. 3.

Figure 3:
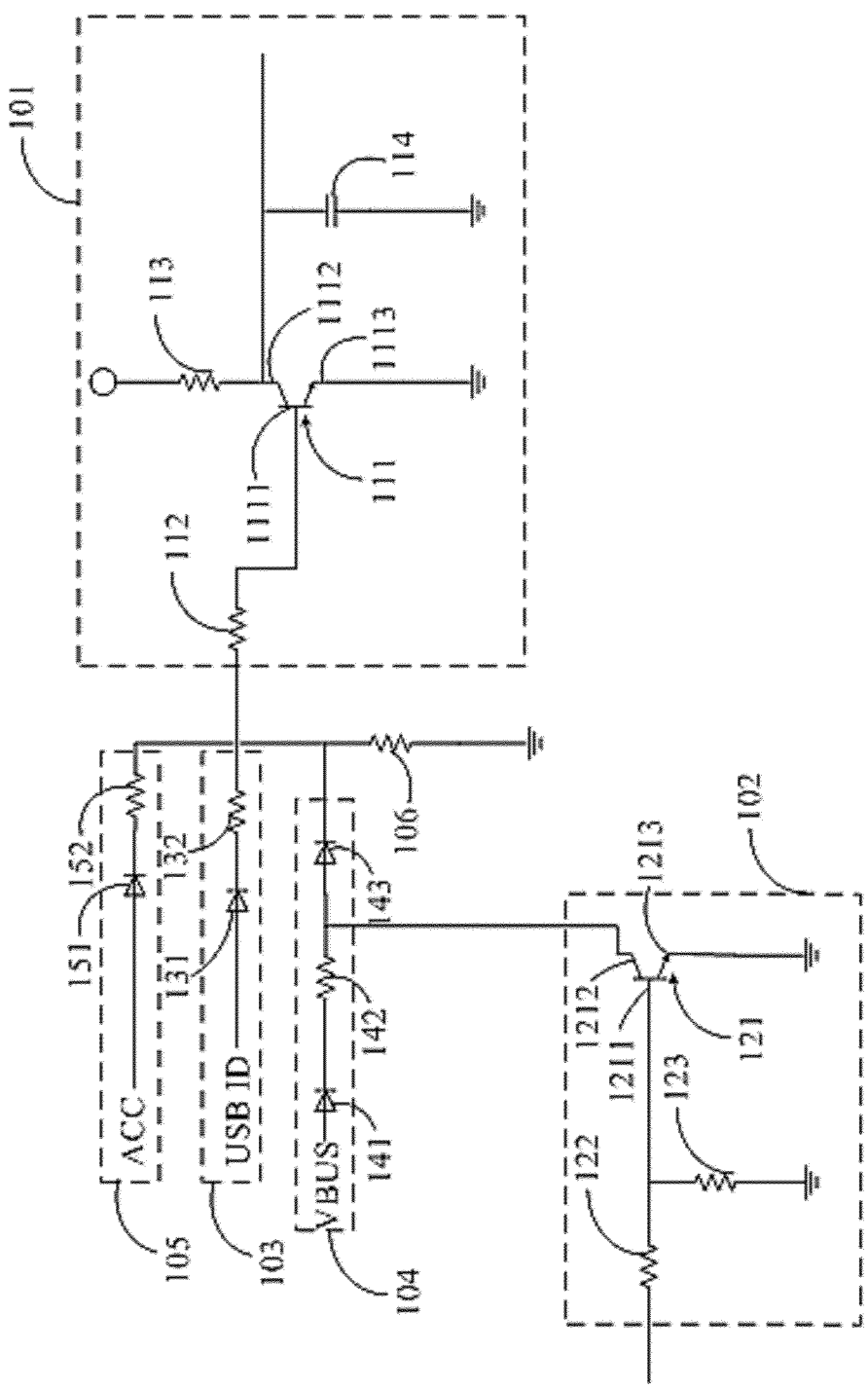
FIG. 3 is a diagram illustrating a circuit of the in-vehicle terminal according to an embodiment of the present invention.

FIG. 3 is a diagram illustrating a circuit of the in-vehicle terminal according to an embodiment of the present invention. As shown in FIG. 3, the difference between the in-vehicle terminal is this embodiment and the aforementioned in-vehicle terminal lies is that the in-vehicle terminal in this embodiment further comprises the third input circuit 105, wherein the third input circuit 105 is configured to transmit the received third trigger signal to the output circuit 101, wherein the connection manner corresponding to the third input circuit 105 is different from those corresponding to the first input circuit 103 and the second input circuit 104. For example, the connection manner corresponding to the third input circuit 105 is the connection manner of the aforementioned Car-dedicated type, wherein the third trigger signal comprises the ACC signal.

As shown in FIG. 3, the third input circuit 105 comprises serially-connected unidirectional conduction element 151 and the resistor 152. The input terminal of the unidirectional conduction element 151 is arranged to receive the ACC signal, and the output terminal thereof is coupled to the input of the output circuit 101 via the resistor 152 so as to transmit the ACC signal to the output circuit 101 via the resistor 152, wherein the output circuit 101 further refers to the ACC signal to output the first control signal which indicates the on/off state of the in-vehicle terminal.

Specifically, if the user selects the connection manner corresponding to the third input circuit 105 to connect the in-vehicle terminal to the vehicle, after the vehicle is powered on, the ACC signal of the ACC signal line in the car battery will be changed from a low voltage level to a high voltage level, and will be transmitted to the output circuit 101 through the diode 151 and the resistor 152 and further transmitted to the base 1111 of the NPN transistor 111 via the resistor 112. The ACC signal of the high voltage level may turn on the NPN transistor 111, and more particularly, turn on the collector 1112 and the emitter 1113 of the NPN transistor 111, so as to pull down the voltage level of the collector 1112 to the low voltage level, that is, to output a control signal at the low voltage level to the GPIO port 116 to indicate the turning on of the in-vehicle terminal 100. After the vehicle is powered off, the ACC signal of the ACC signal line will be changed from the high voltage level to the low voltage level. The ACC signal at the low voltage level may turn off the NPN transistor 111, so as to cut-off the collector 1112 of the NPN transistor 111 from the emitter 1113 of the NPN transistor 111, thereby pulling up the voltage level of the collector 1112, that is, to output a control signal at a high voltage level to the GPIO port 116 to indicate the turning off of the in-vehicle terminal 100.

Figure 4:
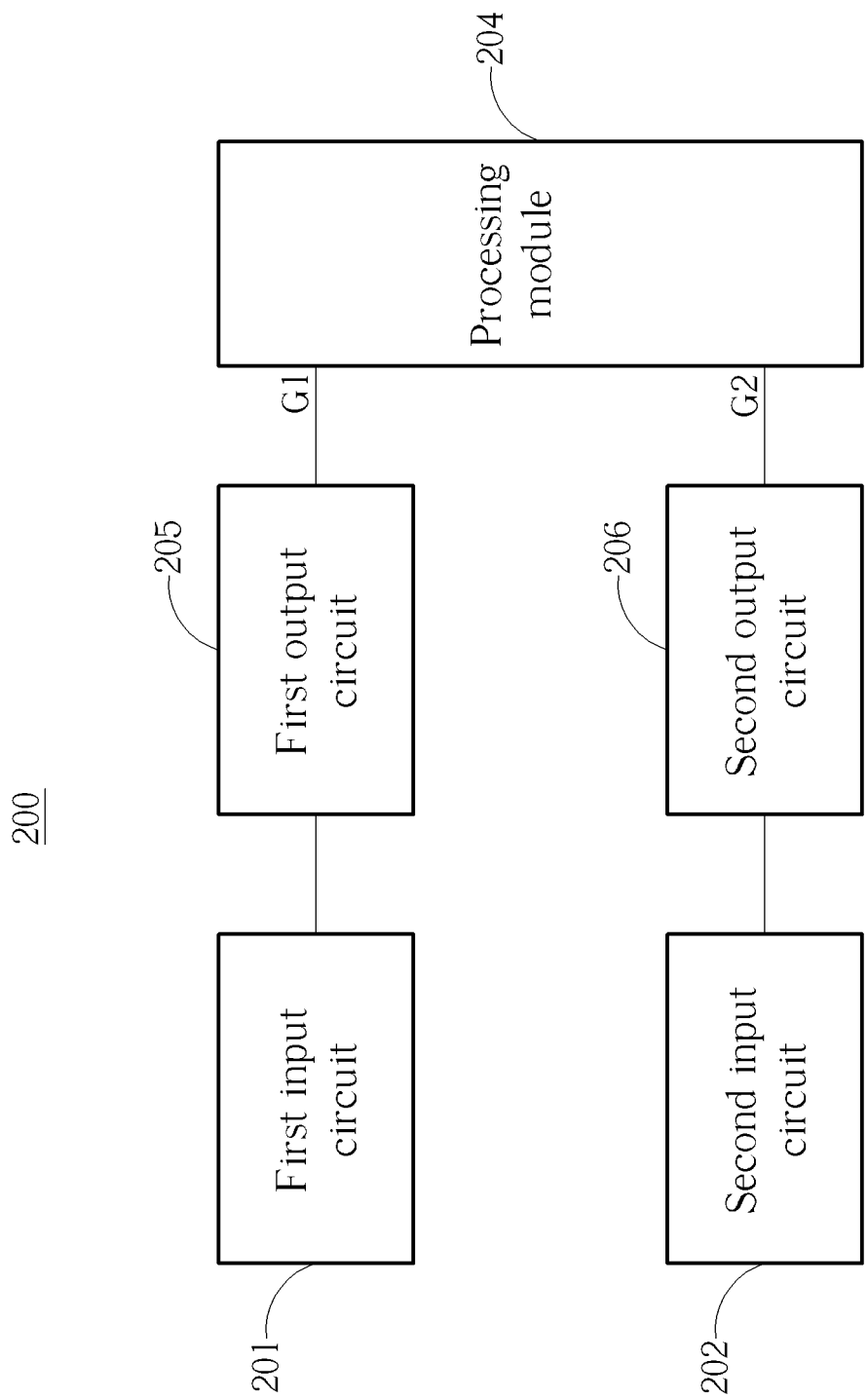
FIG. 4 is a diagram illustrating a circuit of the in-vehicle terminal according to an embodiment of the present invention.

Hence, this embodiment may be compatible with three different connection manners. It should be noted that if there are other similar connection manners corresponding to the third input circuit 105, they can be configured into the switch circuit like the third input circuit 105, so that this embodiment may be compatible with more connection manners In other embodiments, considering that when selecting the roof light or the insurance box to provide power, the VBUS signal in the USB port exists all the time, the aforementioned first input circuit and second input circuit may be divided into two different independent circuits, in order to prevent the VBUS signal in USB port from affecting the USB ID signal when the roof light or the insurance box is selected to provide power. The detailed concept is as follows:

FIG. 4 is a diagram illustrating a circuit of the in-vehicle terminal according to an embodiment of the present invention. As shown in FIG. 4, the in-vehicle terminal 200 still comprises the first input circuit 201 and the second input circuit 202, and further comprises a processing module 204, a first output circuit 205 and a second output circuit 206. The first input circuit 201 is configured to receive the first trigger signal. The first trigger signal may comprise the USB ID signal. The connection manner corresponding to the in-vehicle terminal 200 is the same as the aforementioned connection manner, and is not repeated here. The first output circuit 205 is configured to refer to the first trigger signal to output the first control signal for indicating the on/off state of the in-vehicle terminal to the first touch port G1. For example, if the manner of using the roof light or the insurance box is selected to provide power for the in-vehicle terminal 200, the first input circuit 201 will receive the USB ID signal, so that the first output circuit 205 may output the first control signal according to the USB ID signal. The second input circuit 202 is configured to receive the second trigger signal. The second trigger signal may comprise the VBUS signal. Since the detailed descriptions of the connection manner corresponding to the in-vehicle terminal 200 can be referred to the above contents, and are omitted here for brevity.

The second output circuit 206 is configured to refer to second trigger signal to output the second control signal for indicating the on/off state of the in-vehicle terminal to the second touch port G2. In view of the above, the second trigger signal is the VBUS signal. If a USB port is used to provide power for the in-vehicle terminal 200, the second input circuit 202 will receive the VBUS signal, and the second output circuit 206 will output second control signal according to the VBUS signal, wherein the processing module 204 is configured to turn on/off the in-vehicle terminal 200 according to the signal states of the first touch port G1 and the second touch port G2. More specifically, if the first touch port G1 outputs the first control signal, the in-vehicle terminal 200 will be turned on/off according to the first control signal; and if the second touch port G2 outputs the second control signal, the in-vehicle terminal 200 will be turned on/off according to the second control signal.

Hence, by separating the output circuits respectively corresponding to the first input circuit 201 and the second input circuit 202, when selecting the roof light or the insurance box to provide power for the in-vehicle terminal 200, the present invention embodiment may avoid the situation which the first input circuit 201 and the second input circuit 202 simultaneously receive the trigger signal because of the USB port always remains in the online state, and thereby the output circuit determining the USB ID signal of the first input circuit 201 may not be affected.

Figure 5:
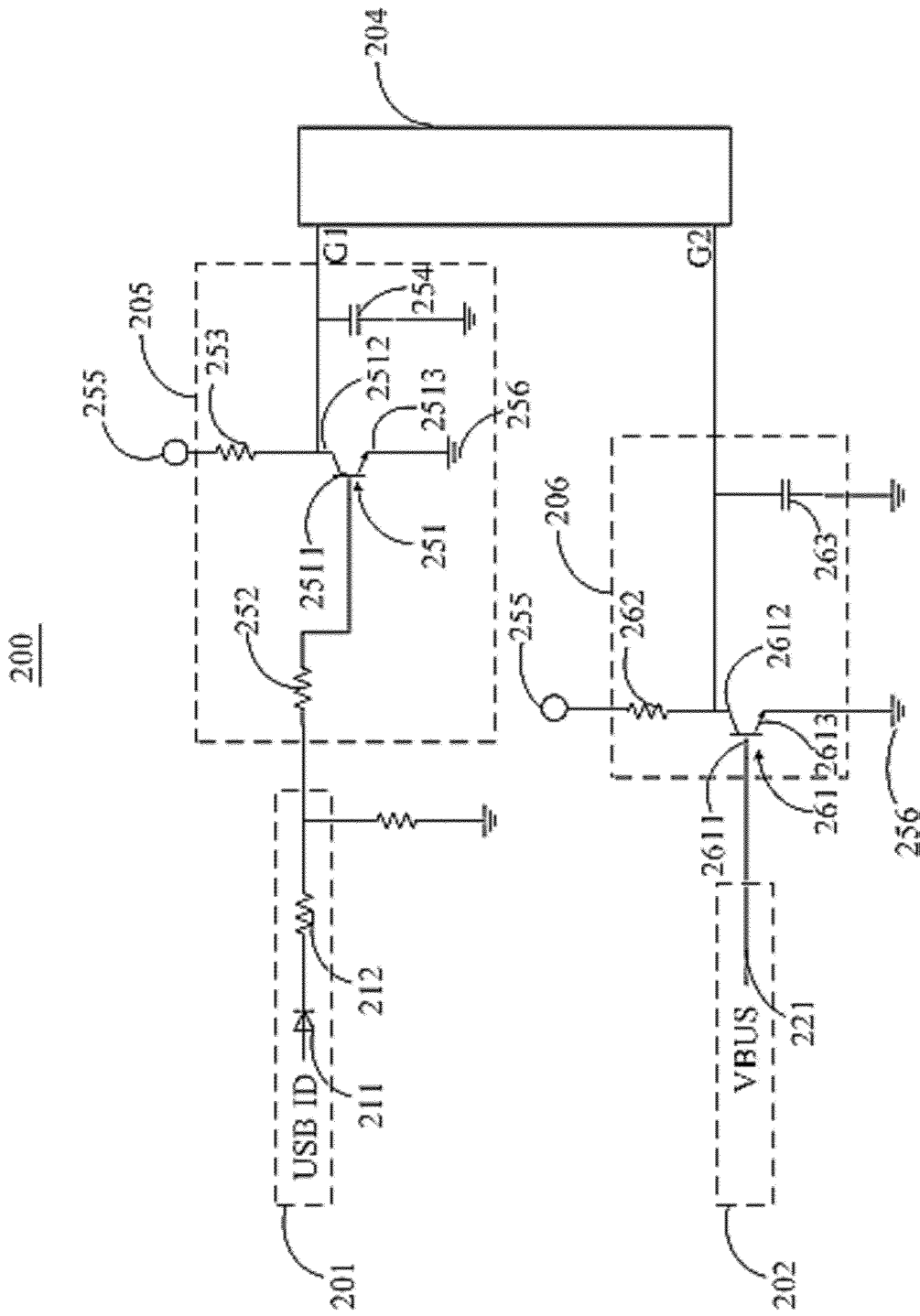
FIG. 5 is a diagram illustrating the circuit of the in-vehicle terminal shown in FIG. 4.

FIG. 5 is a diagram illustrating the circuit of the in-vehicle terminal shown in FIG. 4. As shown in FIG. 5, the first input circuit 201 comprises a unidirectional conduction element 211, and a resistor 212 serially-connected with each other. The input terminal of the unidirectional conduction element 211 is arranged to receive the USB ID signal. The output terminal of the unidirectional conduction element 211 is coupled to the input of the first output circuit 205 via the resistor 212, so as to transmit the USB ID signal to the first output circuit 205 via the resistor 212, wherein the unidirectional conduction element 211 may be implemented with a diode. As shown in FIG. 5, the anode of the diode is coupled to the USB ID signal, and the cathode of the diode is coupled to the resistor 212. In some circumstances, the resistor 212 is an optional element that can be omitted.

As shown in FIG. 5, the first output circuit 205 comprises: a switch unit 251, resistors 252 and 253, and a capacitor 254. The switch unit 251 comprises a control terminal 2511, a first terminal 2512 and a second terminal 2513. The control terminal 2511 is coupled to the output of the first input circuit 201 via the resistor 252 so as to receive the USB ID signal via the resistor 252. The first terminal 2512 of the switch unit 251 is coupled to a first voltage signal source 255 via the resistor 253, and is further coupled to the first control port G1. The second terminal 2513 of the transistor 251 is coupled to a second voltage signal source 256. One terminal of the capacitor 254 is electrically connected to the first terminal 2512 of the switch unit 251, and the other terminal of the capacitor 254 is coupled to the ground for filtering the outputted first control signal. In some embodiments, the switch unit 251 may be an NPN transistor or a PNP transistor, wherein the first voltage signal source 255 may be a power source, and the second voltage signal source 256 may be the ground, or vice versa. The first output circuit 205 may output a high voltage level or a low voltage level signals via the switch unit 251 according to the USB ID signal. The high voltage level or the low voltage level signals may be transmitted to the general-purpose input output (GPIO) port (i.e. the first touch port G1) to turn on or off the in-vehicle terminal 200. For example, if the switch unit 251 is an NPN transistor, the control module 204 may initiate the in-vehicle terminal 200 when the first control signal of the first touch port G1 is at a low voltage level, and may turn off the in-vehicle terminal 200 when the first control signal of the first touch port G1 is at a high voltage level.

As shown in FIG. 5, the second input circuit 202 comprises: an input port 221 for receiving the VBUS signal, and an input port 221 that is further coupled to the input of the second output circuit 206.

As shown in FIG. 5, the second output circuit 206 comprises a switch unit 261, a resistor 262 and a capacitor 263. The switch unit 261 comprises a control terminal 2611, a first terminal 2612 and a second terminal 2613. The control terminal 2611 is coupled to the second input circuit 202, and is configured to receive the VBUS signal. The first terminal 2612 is coupled to first voltage signal source 255 via the resistor 262, and is configured to receive first voltage level signal via resistor the 262. The first terminal 2612 is further coupled to the second touch port G2. The second terminal 2613 is coupled to a second voltage signal source 256 in order to receive the second voltage level signal. The capacitor 263 is coupled between the first terminal 2612 of the switch unit 261 and the ground. Hence, the second output circuit 206 may utilize the switch unit 261 to refer to the VBUS signal to output a high voltage level or a low voltage level. The high voltage level signal or the low voltage level signal may be transmitted to a GPIO port (i.e. the second touch port G2). For example, if the switch unit 261 is an NPN transistor, the processing module 204 may turn on the in-vehicle terminal 200 when the second control signal of the second touch port G2 is changed from the high voltage level to the low voltage level, and the processing module 204 may turn off the in-vehicle terminal 200 when the first control signal of the second touch port G2 is changed from the low voltage level to the high voltage level.

Similarly, by respectively arranging the first output circuit 205 and the second output circuit 206 corresponding to the first input circuit 201 and the second input circuit 202, when the roof light or to insurance box is selected to provide power, the in-vehicle terminal 200 shown in FIG. 5 may prevent the VBUS signal at the USB port from affecting the USB ID signal.

The in-vehicle terminal 200 shown in FIG. 5 is merely compatible with the two connection manners corresponding to the Car-universal type and the Buck line type. However, in some other embodiments, the in-vehicle terminal 200 may be further compatible with the connection manner corresponding to the aforementioned Car-dedicated type. The detailed information can be referred to FIG. 6.

Figure 6:
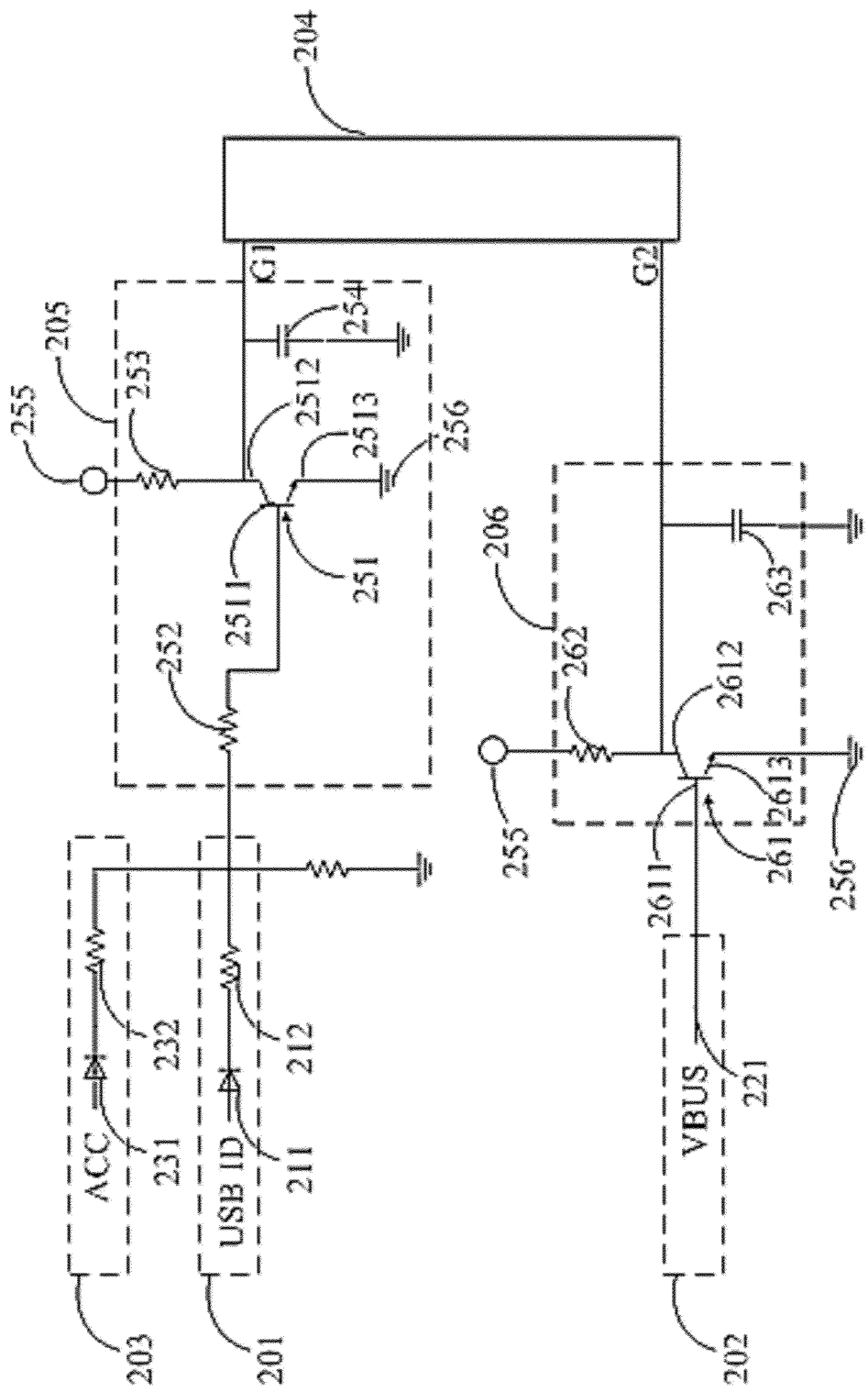
FIG. 6 is a diagram illustrating a circuit of the in-vehicle terminal according to an embodiment of the present invention.

FIG. 6 is a diagram illustrating a circuit of the in-vehicle terminal according to an embodiment of the present invention. As shown in FIG. 6, the difference of the in-vehicle terminal in this embodiment and the in-vehicle terminal in the previous embodiment is that the in-vehicle terminal in this embodiment further comprises a third input circuit 203, wherein the third input circuit 203 is configured to receive a third trigger signal. The third trigger signal may comprise an ACC signal. The power supply manner corresponding to the in-vehicle terminal 200 is similar to that mentioned above, and is omitted here for brevity.

As shown in FIG. 6, the third input circuit 203 comprises serially-connected a unidirectional conduction element 231 and a resistor 232. The input terminal of the unidirectional conduction element 231 is arranged to receive the ACC signal, and the output terminal of the unidirectional conduction element 231 is coupled to the first output circuit 205 via the resistor 232 so as to transmit the ACC signal to the first output circuit 205 via the resistor 232.

The first output circuit 205 further outputs the first control signal to the first touch port G1 according to the ACC signal. Specifically, the first output circuit 205 may utilize the switch unit 251 to output a high voltage level signal or a low voltage level signal according to the ACC signal. For example, if the switch unit 251 an NPN transistor, the control module 204 may turn on the in-vehicle terminal 200 when the first control signal of the first touch port G1 is a low voltage level, and may turn off the in-vehicle terminal 200 when the first control signal of the first touch port G1 is a high voltage level.

Figure 7:
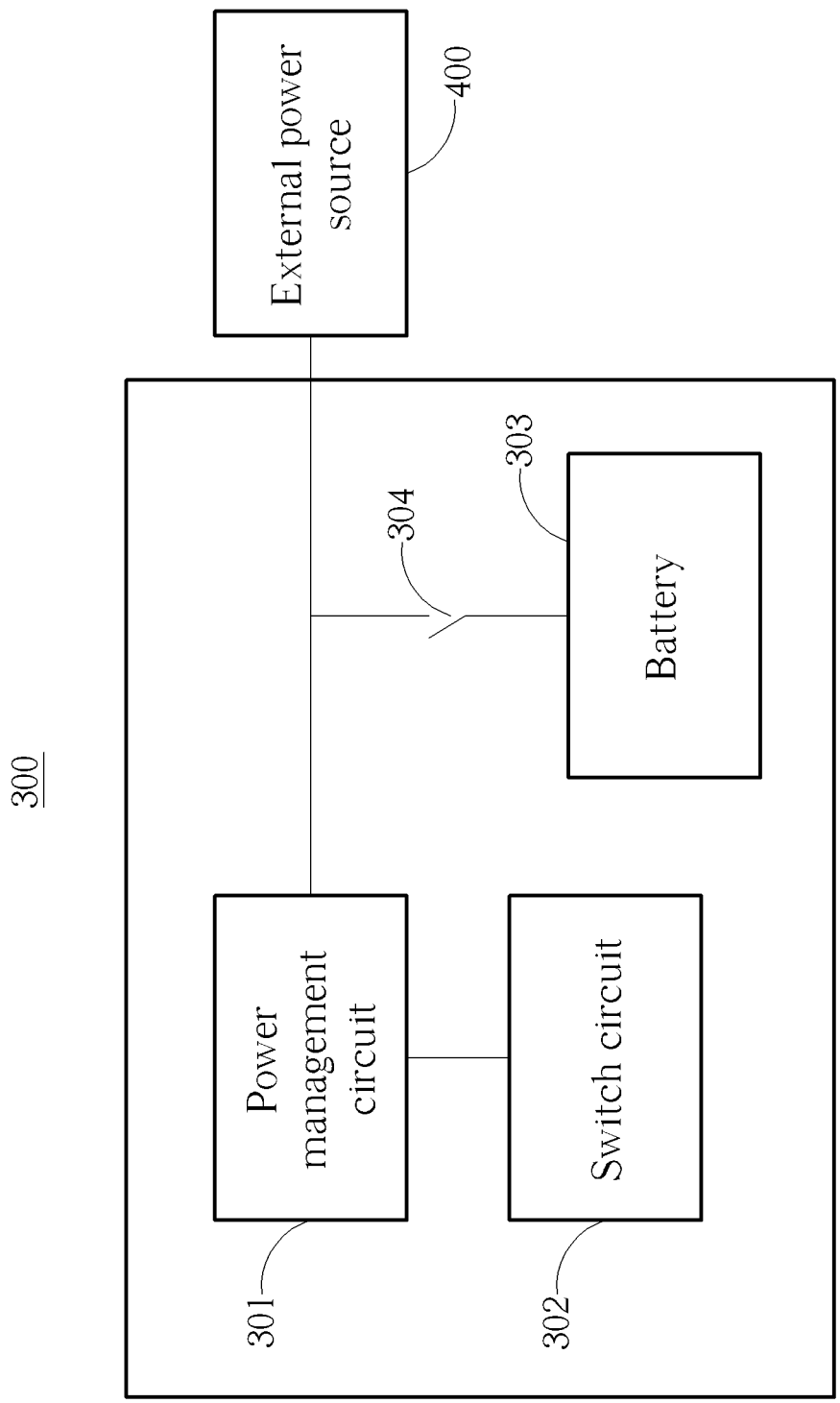
FIG. 7 is a structure diagram of an in-vehicle terminal according to the present invention embodiment.

FIG. 7 is a structure diagram of an in-vehicle terminal according to the present invention embodiment. As shown in FIG. 7, the in-vehicle terminal 300 comprises a power management circuit 301, a switch circuit 302 and a battery 303. The power management circuit 301 provides the power of the battery 303 or an external power source 400 to the switch circuit 302, wherein the switch 304 can be utilized to select between the battery 303 or the external power source 400.

Specifically, when the in-vehicle terminal 300 is conducted to the external power source 400, the switch 304 is turned off and enters a non-conducting state, and the power management circuit 301 selects the external power source 400 to charge the switch circuit 302. When the in-vehicle terminal 300 is not conducted to the external power source 400, the switch 304 is turned on and presents a conducting state, and the power management circuit 301 selects the battery 303 to charge the switch circuit 302. The switch circuit 302 may be applied as the switch circuit in any of the aforementioned embodiments.

Figure 8:
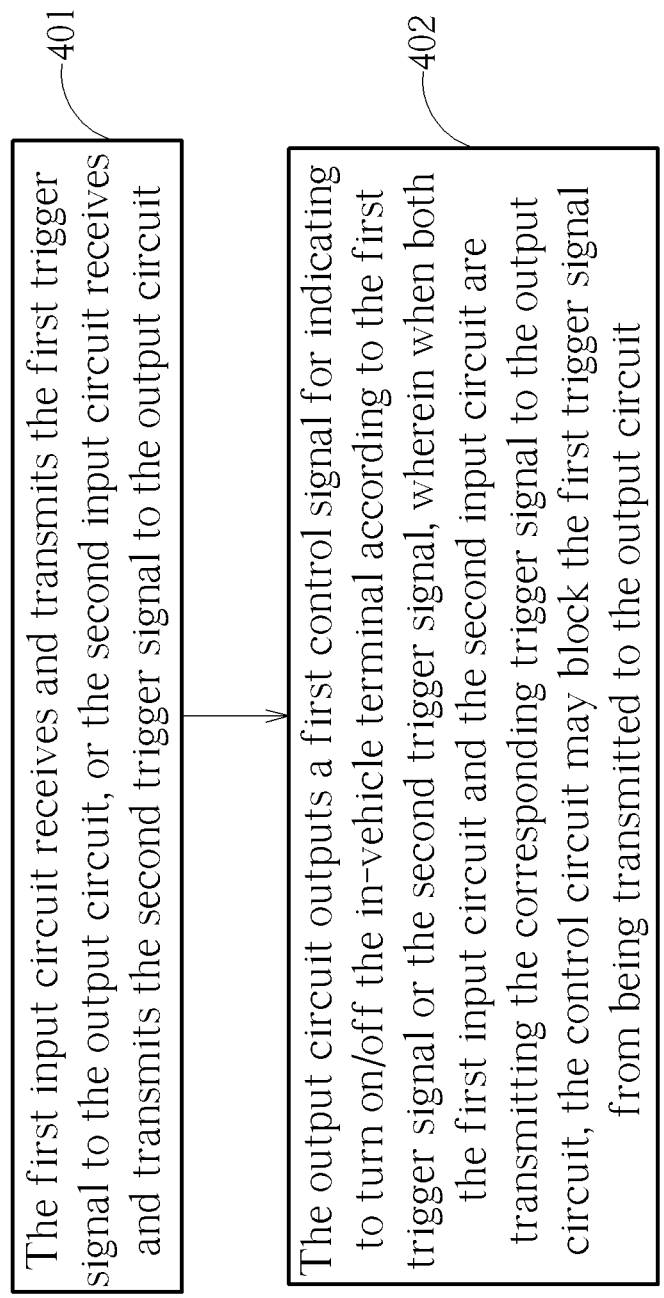
FIG. 8 is a flowchart illustrating a method of turning on/off an in-vehicle terminal according to the present invention embodiment.

An embodiment of the present invention further provides a turning on/off method and an associated in-vehicle terminal. Please refer to FIG. 8, which illustrates a turning on/off method for the in-vehicle terminal shown in FIG. 3. As shown in FIG. 8, the turning on/off method may comprise following steps:

Step 401: The first input circuit 103 receives and transmits the first trigger signal to the output circuit 101, or the second input circuit 104 receives and transmits the second trigger signal to the output circuit 101.

The first trigger signal may comprise the USB ID signal, and the second trigger signal may comprise the VBUS signal, wherein the USB ID signal and the connection manner corresponding to the VBUS signal can be referred to the above case, and thus is omitted here for brevity.

If the user selects the roof light or the insurance box to provide power for the in-vehicle terminal 100, the first input circuit 103 will be used to receive the USB ID signal. If the user selects the car-charging USB port to provide power for the in-vehicle terminal 100, the second input circuit 104 will be used to receive the VBUS signal.

Further, according to the arrangement of the vehicle, the car battery may also be used to provide power. Correspondingly, the in-vehicle terminal 100 may further comprise the third input circuit 105, when the user selects the car battery to provide power for the in-vehicle terminal 100, the third input circuit 105 will receive the third trigger signal. The third trigger signal may comprise the ACC signal. The connection manner corresponding to the ACC signal is similar to that in the previous embodiment, and is omitted here for brevity.

Step 402: The output circuit 101 is configured to output a first control signal for indicating to turn on/off the in-vehicle terminal according to the first trigger signal or the second trigger signal, wherein when both the first input circuit and the second input circuit are transmitting the corresponding trigger signal to the output circuit, the control circuit may block the first trigger signal from being transmitted to the output circuit.

Refer to both Step 401 and Step 402, when the user selects the roof light or the insurance box to provide power for the in-vehicle terminal 100, the output circuit 101 will output the first control signal according to the USB ID signal. The detailed process may be referred to the above descriptions, and is omitted here for brevity.

The control circuit 102 may control the voltage level of the VBUS signal inputted by the second input circuit 104 at a predetermined blocking voltage, e.g. a low voltage level. The detailed process may be referred to the above descriptions, and is omitted here for brevity.

When the user selects the car-charging USB port to provide power for the in-vehicle terminal 100, the output circuit 102 may output the first control signal according to the VBUS signal. The detailed process may be referred to the above descriptions, and is omitted here for brevity.

When the user selects the car battery to provide power for the in-vehicle terminal 100, the output circuit 101 may output the first control signal according to the ACC signal. The detailed process may be referred to the above descriptions, and is omitted here for brevity.

Further, in an embodiment, an option window may be further provided for the user to select or change the manner of power supply. For example, if the user initially selects the USB port to provide power, after a while, the user may adjust the manner of power supplying to the in-vehicle terminal as using the roof light or the insurance according to the actual situation. In this way, after the connection between the in-vehicle terminal 100 and the hardware of the vehicle is completed, the power supply method can be modified with a software manner via the option window.

The above introduction mainly focuses on the turning on/off method of the in-vehicle terminal shown in FIG. 3. The turning on/off method of the in-vehicle terminal shown in FIG. 6 is introduced as follows.

Figure 9:
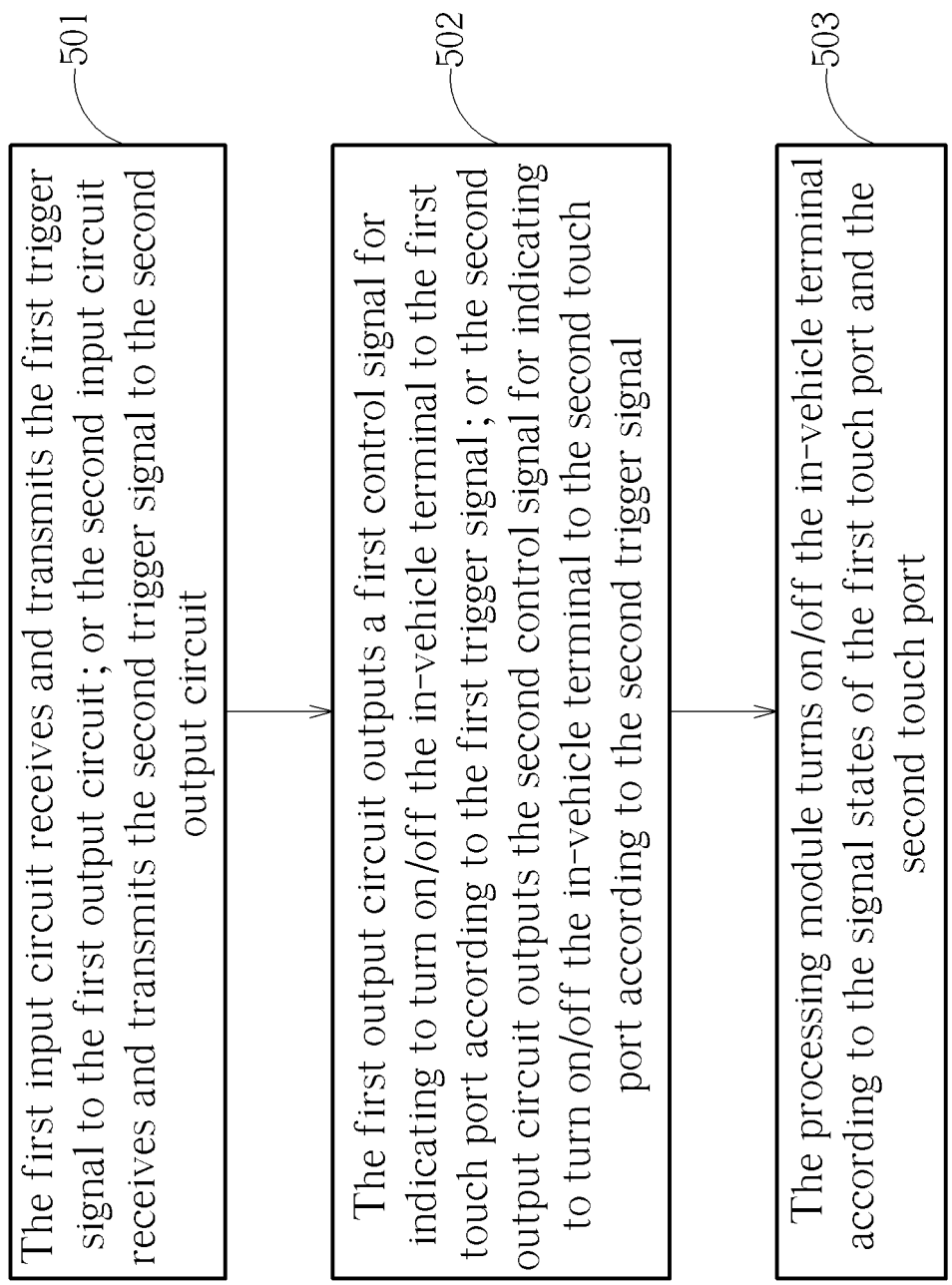
FIG. 9 is a flowchart illustrating a method of turning on/off an in-vehicle terminal according to the present invention embodiment.

Please refer to FIG. 9, which illustrates a turning on/off method of the in-vehicle terminal shown in FIG. 6. As shown in FIG. 9, the turning on/off method comprises following steps:

Step 501: The first input circuit 201 receives and transmits the first trigger signal to the first output circuit 205; or, the second input circuit 202 receives and transmits the second trigger signal to the second output circuit 206.

The first trigger signal may comprise the USB ID signal, and the second trigger signal may comprise the VBUS signal, wherein the USB ID signal and the power supply manner corresponding to the VBUS signal may be referred to the above descriptions, and are omitted here for brevity.

If the user selects the roof light or the insurance box to provide power for the in-vehicle terminal 200, the first input circuit 201 will be the one to receive the USB ID signal. If the user selects use the car-charging USB port to provide power for the in-vehicle terminal 200, the second input circuit 202 will be the one to receive the VBUS signal.

Further, according to the configuration of the vehicle, the car battery may also provide power. Correspondingly, the in-vehicle terminal 200 may further comprise the third input circuit 203, so that when the user selects the car battery to provide power for the in-vehicle terminal 200, the third input circuit 203 may receive the third trigger signal, wherein the third trigger signal may comprise an ACC signal. Since the power providing manner corresponding to the ACC signal may be referred to the above descriptions, and are omitted here for brevity.

Step 502: The first output circuit 205 outputs a first control signal for indicating to turn on/off the in-vehicle terminal 200 to the first touch port G1 according to the first trigger signal; or, the second output circuit 206 outputs the second control signal for indicating to turn on/off the in-vehicle terminal 200 to the second touch port G2 according to the second trigger signal.

Step 502 may be understood by viewing Step 501 together. When the user selects use the roof light or the insurance box to provide power for the in-vehicle terminal 200, the first output circuit 205 may output the first control signal according to the USB ID signal. The detailed process can be referred to the aforementioned contents, and is omitted here for brevity.

When the user selects the car-charging USB port to provide power for the in-vehicle terminal 200, the second output circuit 206 may output the first control signal according to the VBUS signal. The detailed process can be referred to the aforementioned contents, and is omitted here for brevity.

When the user selects the car battery to provide power for the in-vehicle terminal 200, the first output circuit 205 may output the first control signal according to the ACC signal. The detailed process can be referred to the aforementioned contents, and is omitted here for brevity.

Step 503: The processing module 204 turns on/off the in-vehicle terminal according to the signal states of the first touch port G1 and the second touch port G2. The detailed process can be referred to the aforementioned contents, and is omitted here for brevity.

The above is merely embodiments of the present invention, and is not used to limit the scope of the present invention. Any kind of equivalent modifications made for the structures or processes taught in the specification and drawings, that can be directly or indirectly applied to related fields, shall fall within the claimed scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An in-vehicle terminal comprising a switch circuit, wherein the switch circuit comprises:
    an output circuit;
    a control circuit;
    a first input circuit, configured to transmit a received first trigger signal to the output circuit; and
    a second input circuit, configured to transmit a received second trigger signal to the output circuit;
    wherein the output circuit is configured to refer to the first trigger signal or the second trigger signal to output a first control signal for turning on/off the in-vehicle terminal, and the control circuit is configured to block the received second trigger signal from being transmitted to the output circuit when both the first input circuit and the second input circuit are transmitting the corresponding received trigger signal to the output circuit, and the first trigger signal and the second trigger signal are generated according to different manners of power supply.

2. The in-vehicle terminal of claim 1, wherein the first trigger signal comprises a USB ID signal, and the second trigger signal comprises a VBUS signal.

3. The in-vehicle terminal of claim 2, wherein the first input circuit comprises:
    a first unidirectional conduction element, wherein an input terminal of the first unidirectional conduction element is configured to receive the USB ID signal, and an output terminal of the first unidirectional conduction element is configured to transmit the USB ID signal to the output circuit.

4. The in-vehicle terminal of claim 2, wherein the second input circuit comprises:
    a second unidirectional conduction element and a third unidirectional conduction element connected in series, wherein an input terminal of the second unidirectional conduction element is configured to receive the VBUS signal, an output terminal of the second unidirectional conduction element is configured to transmit the VBUS signal to an input terminal of the third unidirectional conduction element, and an output terminal of the third unidirectional conduction element is configured to transmit the VBUS signal to the output circuit; and
    the control circuit, configured to control the voltage level of an input terminal of the third unidirectional conduction element at a predetermined blocking voltage, when both the first input circuit and second input circuit are transmitting the corresponding received trigger signal to the output circuit, to block the second trigger signal from transmitting to the output circuit.

5. The in-vehicle terminal of claim 4, wherein the control circuit comprises:
    a first switch unit having a first control terminal, a first terminal and a second terminal, wherein the first control terminal is configured to receive a second control signal, the first terminal is electrically connected to a connection node between the second unidirectional conduction element and the third unidirectional conduction element, and the second terminal is coupled to ground;
    wherein when the first control terminal receives the second control signal, the first terminal of the first switch unit is conducted to the second terminal of the first switch unit to clamp the voltage of the connection node at a blocking voltage, and the second control signal is generated when the first input circuit receives the USB ID signal.

6. The in-vehicle terminal of claim 4, wherein the third trigger signal comprises an ACC signal; and the third input circuit comprises:
    a fourth unidirectional conduction element, wherein an input terminal of the fourth unidirectional conduction element is configured to receive the ACC signal, and an output terminal of the fourth unidirectional conduction element is configured to transmit the ACC signal to the output circuit; and the second control terminal of the second switch unit is further coupled to the third input circuit.

7. The in-vehicle terminal of claim 2, wherein the output circuit comprises:
a second switch unit, comprising a second control terminal, a third terminal and a fourth terminal, wherein the second control terminal of the second switch unit is coupled to outputs of the first input circuit and a second input circuit, the third terminal of the second switch unit is respectively coupled to a first voltage signal source and a touch port, and the fourth terminal of the second switch unit is coupled to a second voltage signal source;
wherein the second switch unit is configured to output the first control signal to the touch port according to the VBUS signal or the USB ID signal.

8. The in-vehicle terminal of claim 7, wherein the switch circuit further comprises:
a third input circuit, configured to transmit a received third trigger signal to the output circuit;
wherein the output circuit is configured to refer to the first trigger signal, the second trigger signal or the third trigger signal to output the first control signal for turning on/off the in-vehicle terminal, and the first trigger signal, the second trigger signal, and the third trigger signal are generated according to different manners of power supply.

9. An in-vehicle terminal comprising a switch circuit, wherein the in-vehicle terminal further comprises a processing module, and the switch circuit comprises:
a first input circuit, configured to receive first trigger signal; and
a first output circuit, configured to output a first control signal for indicating to turn on/off the in-vehicle terminal to a first touch port according to the first trigger signal;
a second input circuit, configured to receive a second trigger signal; and
a second output circuit, configured to output a second control signal for indicating to turn on/off the in-vehicle terminal according to the second trigger signal to a second touch port;
wherein the processing module turns on or off the in-vehicle terminal according to a signal from the first touch port and the second touch port, and the first trigger signal and the second trigger signal are generated according to different manners of power supply.

10. The in-vehicle terminal of claim 9, wherein the first trigger signal comprises a USB ID signal, and the second trigger signal comprises a VBUS signal.

11. The in-vehicle terminal of claim 10, wherein:
the second input circuit comprises an input port configured to receive the VBUS signal, and the input port is further electrically connected to the second output circuit;
the second output circuit comprises:
a switch unit comprising a control terminal, a first terminal and a second terminal, wherein the control terminal of the second output circuit is coupled to the second input circuit, the first terminal of the second output circuit is respectively coupled to the first voltage signal source and the second touch port, the second terminal of the second output circuit is coupled to the second voltage signal source; and the switch unit is configured to output the second control signal to the second touch port according to the VBUS signal.

12. The in-vehicle terminal of claim 10, wherein the switch circuit further comprises:
a third input circuit, configured to transmit a received third trigger signal to the output circuit;
wherein the output circuit is configured to refer to the first trigger signal or the third trigger signal to output the first control signal to the first touch port, and the first trigger signal, the second trigger signal, and the third trigger signal are generated according to different manners of power supply.

13. The in-vehicle terminal of claim 12, wherein the first input circuit comprises a first unidirectional conduction element, wherein an input terminal of the first unidirectional conduction element is configured to receive the USB ID signal, and an output terminal of the first unidirectional conduction element is configured to transmit the USB ID signal to the first output circuit;
the first output circuit comprises:
a switch unit comprising a control terminal, a first terminal and a second terminal, wherein the control terminal of the first output circuit is coupled to the first input circuit, the first terminal of the first output circuit is respectively coupled to the first voltage signal source and the first touch port, and the second terminal of the first output circuit is coupled to the second voltage signal source;
wherein the switch unit is configured to output the first control signal to the first touch port according to the USB ID signal.

14. The in-vehicle terminal of claim 13, wherein the third trigger signal comprises an ACC signal; and the third input circuit comprises:
a second unidirectional conduction element, wherein an input terminal of the second unidirectional conduction element is configured to receive the ACC signal, and an output terminal of the second unidirectional conduction element is configured to transmit the ACC signal to the first output circuit; and the control terminal of the second switch unit is further coupled to the third input circuit.

15. A method for turning on/off an in-vehicle terminal, wherein the switch circuit comprises a first input circuit, a second input circuit, an output circuit and a control circuit, and the method comprises:
the first input circuit receiving and transmitting a first trigger signal to the output circuit, and/or the second input circuit receiving and transmitting a second trigger signal to the output circuit;
the output circuit outputting a first control signal for indicating to turn on/off the in-vehicle terminal according to the first trigger signal or the second trigger signal to; and
the control circuit blocking the second trigger signal from being transmitted to the output circuit when both the first input circuit and the second input circuit are transmitting the corresponding trigger signal to the output circuit;
wherein the first trigger signal and the second trigger signal are generated according to different manners of power supply.

16. The method of claim 15, wherein the first trigger signal comprises a USB ID signal, and the second trigger signal comprises a VBUS signal, the method further comprises:

the first input circuit receiving and transmitting the USB ID signal to the output circuit, and/or the second input circuit receiving and transmitting the VBUS signal to the output circuit;

the control circuit clamping the voltage of the VBUS signal from the second input circuit at a blocking voltage to block the VBUS signal from being transmitted to the output circuit; and the output circuit outputting the first control signal according to the USB ID signal.

17. The method of claim 16, wherein the switch circuit further comprises a third input circuit, the method further comprises:

the third input circuit receiving and transmitting a third trigger signal to the output circuit, and the third trigger signal comprising an ACC signal; and the output circuit outputting the first control signal according to the ACC signal;

wherein the first trigger signal, the second trigger signal, and the third trigger signal are generated according to different manners of power supply.

\* \* \* \* \*